(12) United States Patent
Sikorski et al.

(10) Patent No.: US 8,585,345 B2
(45) Date of Patent: Nov. 19, 2013

(54) COUPLER WITH PIVOTING FRONT HOOK LOCK

(75) Inventors: Robert J. Sikorski, Stow, OH (US); Shadruz Daraie, Fairlawn, OH (US)

(73) Assignee: Paladin Brands Group, Inc., Oak Brook, IL (US)

( * ) Notice: Subject to any disclaimer, the term of this patent is extended or adjusted under 35 U.S.C. 154(b) by 155 days.

(21) Appl. No.: 13/072,098

(22) Filed: Mar. 25, 2011

(65) Prior Publication Data

US 2011/0286788 A1 Nov. 24, 2011

Related U.S. Application Data

(60) Provisional application No. 61/317,920, filed on Mar. 26, 2010.

(51) Int. Cl.
*E02F 3/36* (2006.01)

(52) U.S. Cl.
CPC .......... *E02F 3/3609* (2013.01); *E02F 3/3672* (2013.01); *E02F 3/3622* (2013.01); *E02F 3/3627* (2013.01); *E02F 3/3645* (2013.01); *E02F 3/365* (2013.01); *E02F 3/3659* (2013.01); *E02F 3/3663* (2013.01)
USPC .......................................... 414/723; 414/724

(58) Field of Classification Search
CPC ..... E02F 3/3663; E02F 3/3672; E02F 3/3622; E02F 3/3631; E02F 3/3627; E02F 3/962; E02F 3/404; E02F 3/401; E02F 3/3609; E02F 3/365; E02F 3/3645; E02F 3/3659; B66F 9/12
USPC .................................................. 414/723, 724
See application file for complete search history.

(56) References Cited

U.S. PATENT DOCUMENTS

| | | |
|---|---|---|
| 5,549,440 A | 8/1996 | Cholakon et al. |
| 5,692,325 A | 12/1997 | Kuzutani |
| 5,890,871 A | 4/1999 | Woerman |

(Continued)

FOREIGN PATENT DOCUMENTS

| | | |
|---|---|---|
| WO | WO 2008/029112 | 3/2008 |
| WO | WO 2008029112 A2 * | 3/2008 |

OTHER PUBLICATIONS

Notification of Related Application (U.S. Appl. No. 12/622,921).

(Continued)

*Primary Examiner* — Saul Rodriguez
*Assistant Examiner* — Brendan Tighe
(74) *Attorney, Agent, or Firm* — Fay Sharpe LLP

(57) ABSTRACT

An attachment coupler includes a frame including a front hook and rear hook. A rear hook lock moves between an unlocked and a locked position relative to the rear hook. An actuator moves the rear hook lock to its unlocked and locked positions. A gravity lock moves between an engaged and a disengaged position and obstructs movement of the rear hook lock to its unlocked position when the gravity lock is engaged. A supplemental lock arm moves relative to the frame between an engaged position and a disengaged position. A secondary lock is located adjacent the front hook and includes a latch that moves between an extended and a retracted position. The latch obstructs the front hook when extended. The supplemental lock arm blocks movement of the latch from its extended position to its retracted position when the supplemental lock arm is in its engaged position. A spring urges the latch toward its extended position.

15 Claims, 13 Drawing Sheets

(56) References Cited

U.S. PATENT DOCUMENTS

| | | | |
|---|---|---|---|
| 6,132,131 A | 10/2000 | Nakamura et al. | |
| 6,301,811 B1 * | 10/2001 | Gilmore, Jr. | 37/468 |
| 6,422,805 B1 | 7/2002 | Miller | |
| 6,431,785 B1 | 8/2002 | Melander | |
| 6,481,124 B1 | 11/2002 | Miller et al. | |
| 6,508,616 B2 | 1/2003 | Hung | |
| 6,691,438 B2 | 2/2004 | Fatemi | |
| 6,699,001 B2 | 3/2004 | Fatemi | |
| 6,773,223 B2 * | 8/2004 | Harris et al. | 414/723 |
| 6,881,002 B2 | 4/2005 | Fatemi | |
| 6,902,346 B2 | 6/2005 | Steig, Jr. et al. | |
| 6,962,475 B2 | 11/2005 | Fatemi | |
| 6,964,122 B2 | 11/2005 | Cunningham et al. | |
| 7,306,395 B2 | 12/2007 | Fatemi | |
| 7,426,796 B2 | 9/2008 | Cunningham et al. | |
| 7,493,712 B2 | 2/2009 | McCormick et al. | |
| 7,648,305 B2 | 1/2010 | Beales | |
| 7,984,575 B2 | 7/2011 | Robl et al. | |
| 7,984,576 B2 * | 7/2011 | Miller et al. | 37/468 |
| 8,262,310 B2 | 9/2012 | Sikorski et al. | |
| 2007/0157492 A1 | 7/2007 | Miller et al. | |
| 2007/0166143 A1 | 7/2007 | Hart et al. | |
| 2008/0067784 A1 | 3/2008 | Calvert et al. | |
| 2008/0193210 A1 | 8/2008 | Beales | |
| 2009/0249661 A1 | 10/2009 | Daraie et al. | |
| 2009/0282712 A1 * | 11/2009 | Pruszynski | 37/468 |
| 2010/0031539 A1 | 2/2010 | Daraie et al. | |
| 2010/0061799 A1 | 3/2010 | Hill | |
| 2010/0067982 A1 | 3/2010 | Hill | |
| 2010/0107456 A1 | 5/2010 | Miller et al. | |
| 2010/0192425 A1 | 8/2010 | Miller et al. | |
| 2010/0232920 A1 | 9/2010 | Calvert et al. | |
| 2011/0286788 A1 * | 11/2011 | Sikorski et al. | 403/315 |

OTHER PUBLICATIONS

International Search Report mailed Jan. 21, 2010 for International application No. PCT/US09/65346.

Written Opinion mailed Jan. 21, 2010 for International application No. PCT/US09/65346.

* cited by examiner

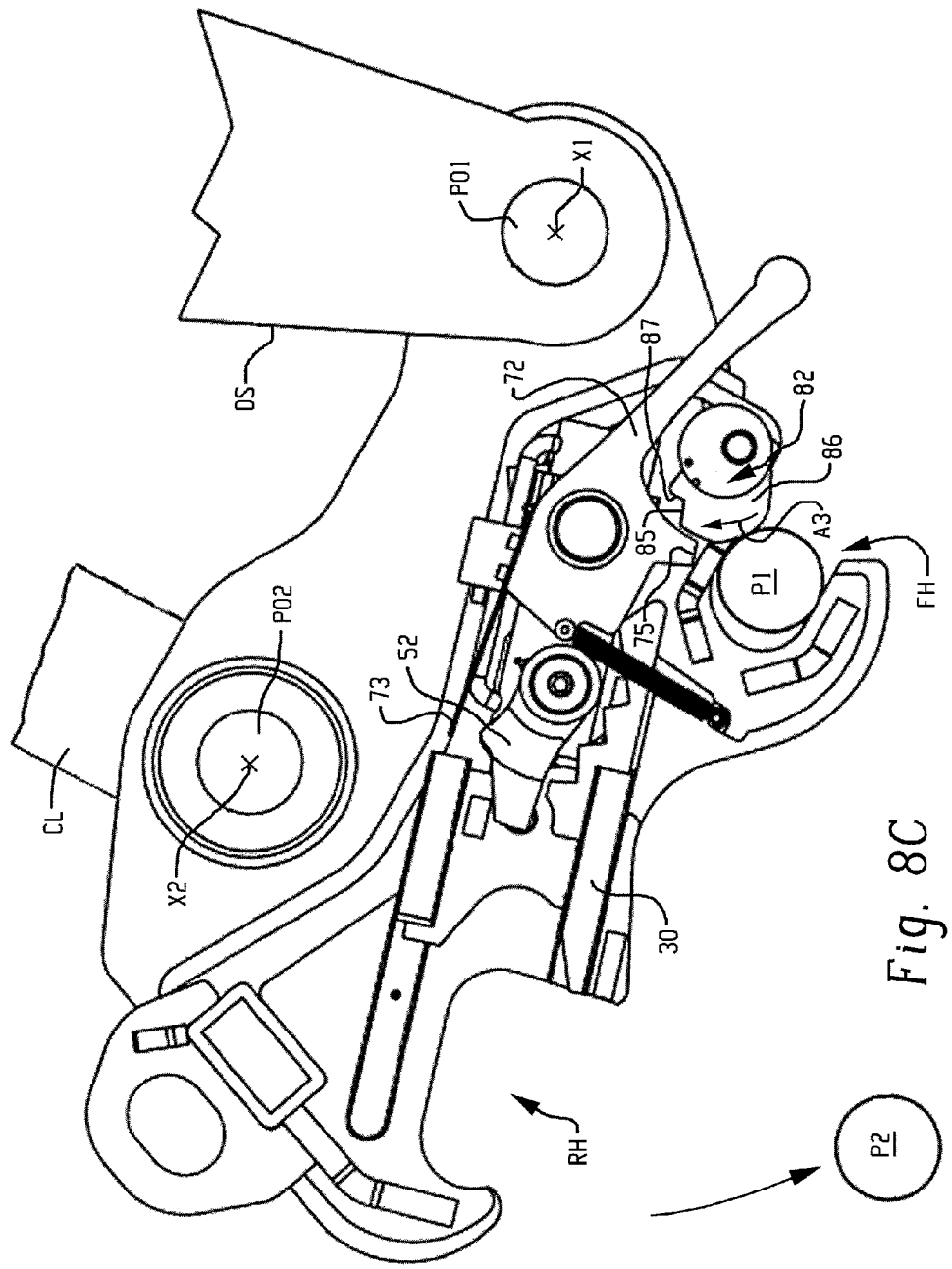

COUPLER WITH PIVOTING FRONT HOOK LOCK

CROSS-REFERENCE TO RELATED APPLICATION

This application claims priority from and benefit of the filing date of U.S. provisional application Ser. No. 61/317,920 filed Mar. 26, 2010 (Mar. 26, 2010), and the entire disclosure of said prior provisional application is hereby incorporated by reference into the present specification.

BACKGROUND

Couplers are known for securing construction attachments, such as buckets, impact hammers, shears, etc., fixedly and operatively to both an arm (or "dipper-stick") and a control link of a tractor, backhoe, excavator or other type of construction/agricultural machine (the term "excavator" as used herein is intended to encompass an excavator, tractor, backhoe, and/or other machine having an arm and a control link). As is generally well known, these couplers are used as an alternative to a pin-on connection for operatively securing an associated attachment to the arm and control link. The control link is used to pivot the coupler (and any attachment coupled thereto) relative to the arm to adjust the angular position or orientation of the coupler relative to arm. The coupler includes a lock system for releasably engaging and retaining first and second parallel attachment pins that are secured to the attachment.

SUMMARY

In accordance with one exemplary embodiment, an attachment coupler is provided that includes a frame including: (i) an upper portion adapted for connection to an associated excavator arm and an associated excavator control link; and, (ii) a lower portion including a front hook and rear hook respectively adapted for engaging first and second associated attachment pins of an associated attachment. The coupler also includes a rear hook lock that is movable between an unlocked position and a locked position, wherein the rear hook lock obstructs the rear hook sufficiently to capture the second associated attachment pin in the rear hook when in the locked position and wherein the rear hook lock is withdrawn relative to the rear hook sufficiently to allow movement of the second associated attachment pin into and out of the rear hook when in the unlocked position. The coupler includes an actuator operably connected to the rear hook lock for moving the rear hook lock to and between its unlocked position and its locked position. A first gravity lock pivots relative to the frame between an engaged position and a disengaged position. The first gravity lock blocks movement of the rear hook lock from its locked position to its unlocked position when the first gravity lock is located in its engaged position. A first supplemental lock arm is movable relative to the frame between an engaged position and a disengaged position, wherein the first supplemental lock arm urges the first gravity lock toward its engaged position when the first supplemental lock arm is in its engaged position. A secondary lock is located adjacent the front hook, and the secondary lock includes a latch that moves between an extended position and a retracted position. The latch includes at least a first latch projection that projects into and obstructs the front hook sufficiently to capture the first associated attachment pin in the front hook when the latch is in its extended position and that is retracted relative to the front hook sufficiently to allow movement of the first associated attachment pin into and out of the front hook when the latch is in its retracted position. The first supplemental lock arm blocks movement of the latch from its extended position to its retracted position when the first supplemental lock arm is in its engaged position. The latch is biased to its extended position and movable from its extended position to its retracted position by contact between the latch and the first associated attachment pin when the first supplemental lock arm is in its disengaged position.

In accordance with another exemplary embodiment, an attachment coupler includes a frame including a front hook and rear hook respectively adapted for engaging first and second associated attachment pins. A rear hook lock is movable between an unlocked position and a locked position relative to said rear hook. An actuator is operably connected to the rear hook lock for moving the rear hook lock to its unlocked position and its locked position. A gravity lock moves relative to the frame between an engaged position and a disengaged position. The gravity lock obstructs movement of the rear hook lock from its locked position to its unlocked position when the gravity lock is located in its engaged position. A supplemental lock arm moves relative to the frame between an engaged position and a disengaged position. A secondary lock is located adjacent the front hook and includes a latch that moves between an extended position and a retracted position. The latch obstructs the front hook when the latch is in its extended position. The supplemental lock arm blocks movement of the latch from its extended position to its retracted position when the first supplemental lock arm is in its engaged position. A spring urges the latch toward its extended position.

BRIEF DESCRIPTION OF DRAWINGS

FIGS. 8A, 8B, 8C, and 8D show a process for unlocking the coupler and decoupling from the first and second associated attachment pins (or, when viewed in the opposite sequence, for coupling with the first and second associated attachment pins and locking the coupler);

DETAILED DESCRIPTION

Figure 6:
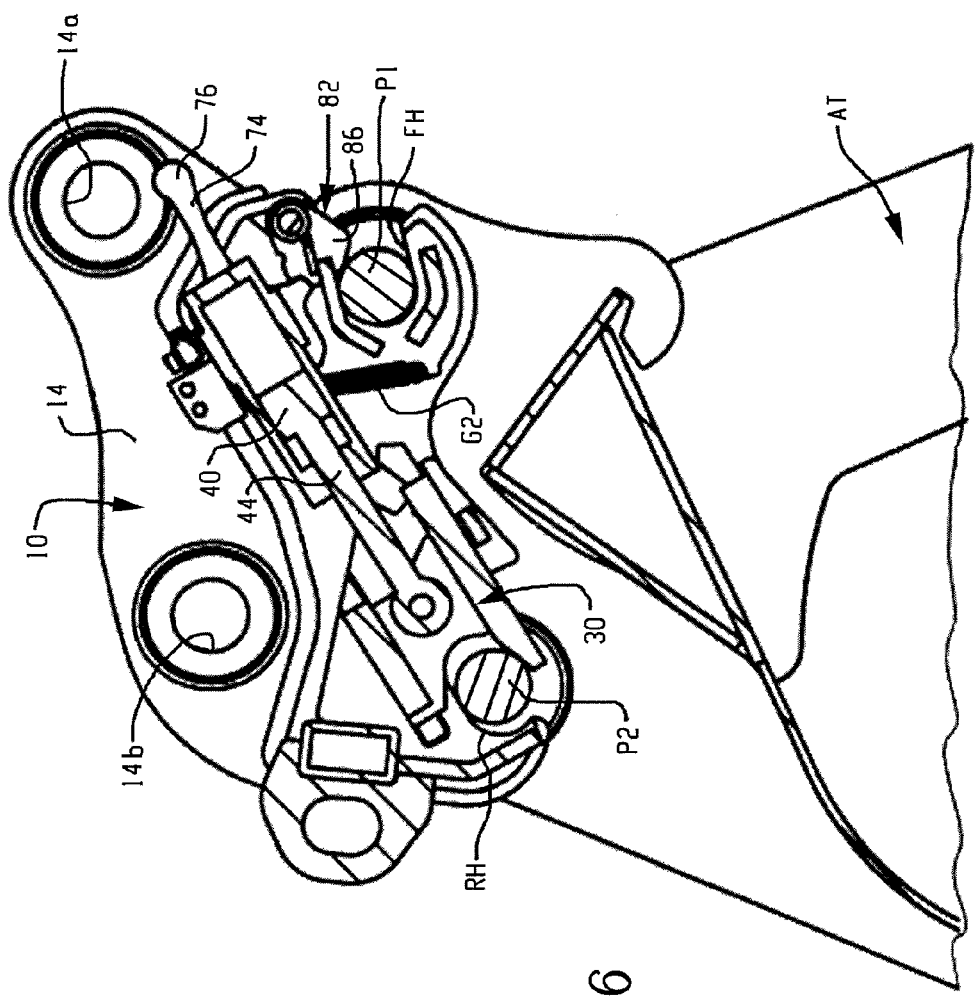
FIG. 6 shows the coupler operatively engaged with first and second associated attachment pins of a bucket attachment, with portions of the coupler and bucket removed to reveal underlying components and structures.
Figure 8A:
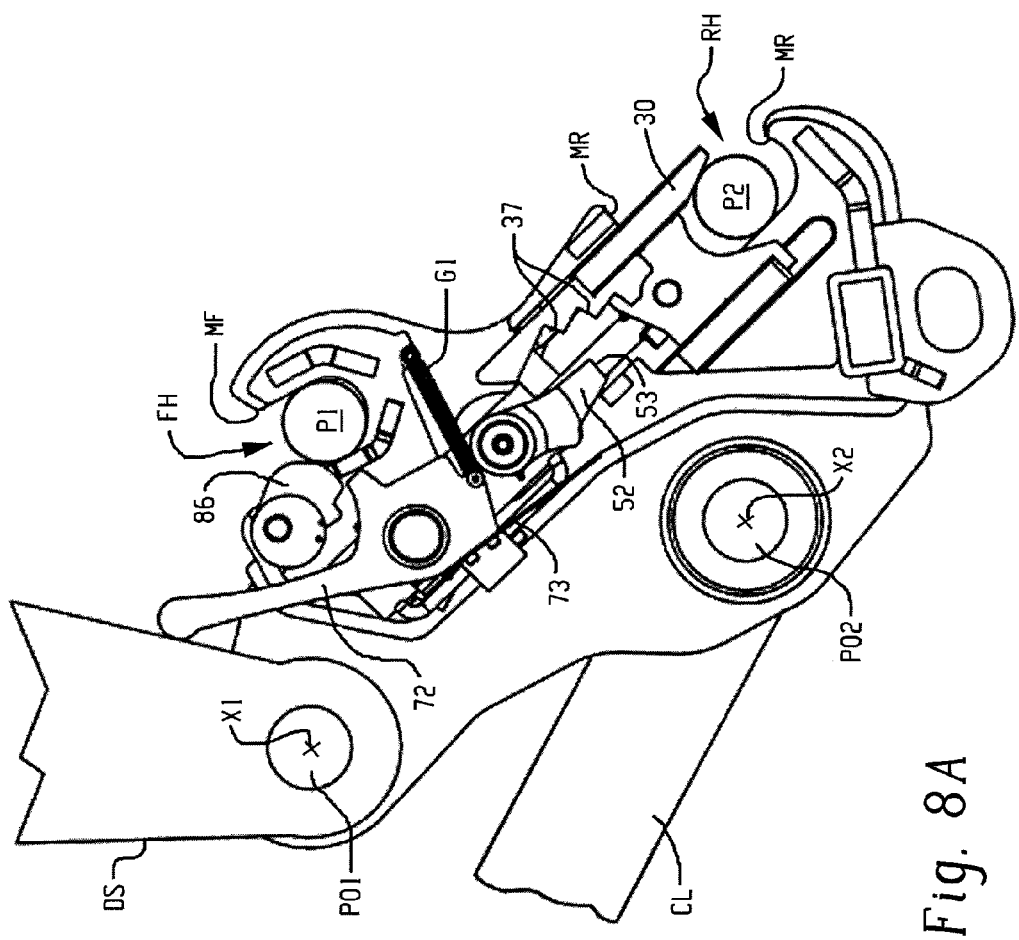
Figure 8B:
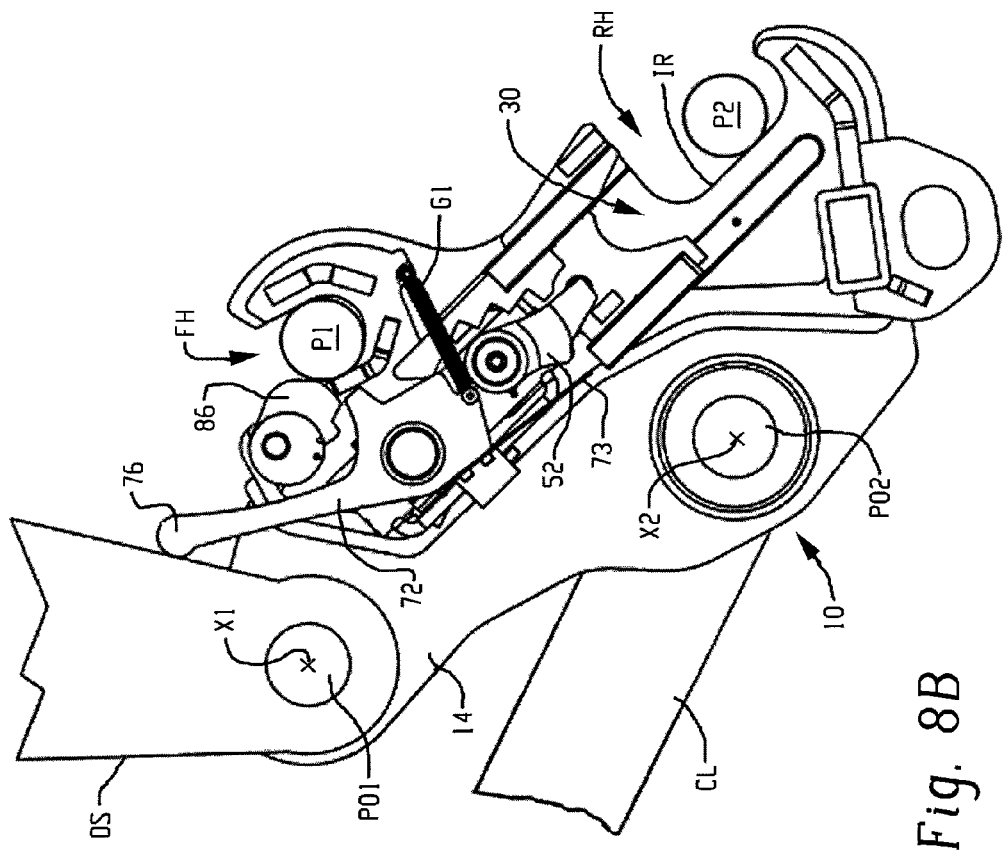

A coupler 10 formed in accordance with the present development is adapted for operative pivoting connection to an excavator, backhoe, or like machine (generally referred to herein as an "excavator") having a boom or arm or "dipper stick" DS and a control link CL as shown in FIGS. 8A,8B,8C. As shown in FIG. 6, the coupler 10 is adapted for being selectively operatively coupled to an associated construction attachment AT, e.g., a bucket, blade, shear, hammer, or other construction or agricultural implement. The associated attachment AT, which is only partially shown, includes a first (front) pin P1 and second (rear or link) pin P2. Attachment pins P1 and P2 are parallel and spaced-apart relative to each other.

Referring to FIGS. 1-4, the coupler 10 comprises a frame F comprising an upper portion U adapted to be secured to the associated excavator, and a lower portion L adapted to be releasably coupled to the bucket or other attachment AT having the first and second parallel, spaced-apart attachment pins P1,P2. The upper portion U comprises first and second parallel, spaced-part upper ribs 12,14 each comprising first and second apertures 12a,12b (for the first upper rib 12) and 14a,14b (for the second upper rib 14). The respective first apertures 12a,14a are aligned with each other along a first pin-on axis X1 (FIG. 3) and the respective second apertures 12b,14b are aligned with each other along a second pin-on axis X2. The coupler 10 is adapted to receive the associated excavator arm DS and associated excavator control link CL in the channel defined between the upper ribs 12,14, with the excavator arm DS pivotally secured to the coupler 10 by a first pin-on pin P01 (FIG. 8A) received through the excavator arm DS and the aligned first apertures 12a,14a, and with the excavator control link CL pivotally secured to the coupler 10 by a second pin-on pin P02 received through the excavator control link CL and the aligned second apertures 12b,14b, to secure the coupler 10 operatively to the associated excavator. The upper ribs 12 and 14 can be one-piece or multi-piece and are constructed using steel such as one or more steel plates or castings or the like.

Figure 7:
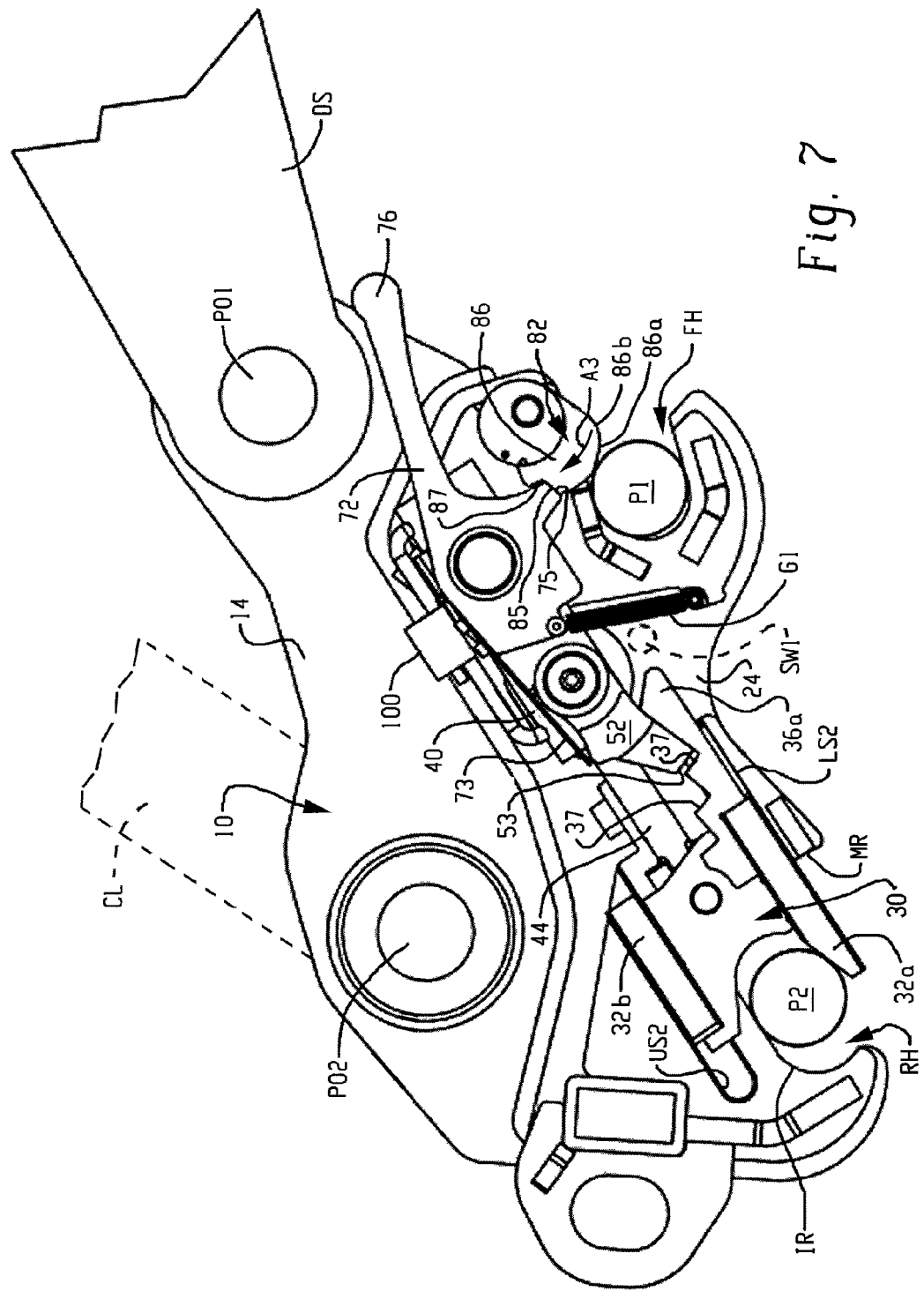
FIG. 7 is a left side view of the coupler with the left side removed and showing the coupler operatively engaged with first and second associated attachment pins (the attachment itself is not shown)

The lower portion L comprises first and second lower ribs 22,24 that are respectively secured to the first and second upper ribs 12,14. The upper ribs 12,14 can alternatively be defined together with the lower ribs 22,24, respectively, as a one-piece casting or other one-piece structure if desired. The first and second lower ribs 22,24 each comprise first and second open recesses 22a,22b (for the first lower rib 22) and 24a,24b (for the second lower rib 24). The respective first recesses 22a,24a are aligned with each other, and the respective second recesses 22b,24b are aligned with each other so that first recesses 22a,22b cooperate to define a first or front hook FH adapted to receive the first associated attachment pin P1 (FIGS. 6 & 7) and the second recesses 22b,24b cooperate to define a second or rear hook RH adapted to receive the second associated attachment pin P2 (FIGS. 6 & 7). As shown, one or more first hook plates 23a preferably extend between and interconnect the first and second lower ribs 22,24 in the region of the first recesses 22a,24a and further define the front hook FH. Likewise, one or more second hook plates 23b preferably extend between and interconnect the first and second lower ribs 22,24 in the region of the second recesses 22b,24b and further define the rear hook RH. The lower ribs 22,24 can each be one-piece or multi-piece steel plates, castings or the like. The illustrated frame F includes an optional lift eye 26 welded or otherwise connected thereto of formed as a part thereof. The frame F and the other coupler components described below are defined from suitable metals, e.g., steel alloys, unless otherwise specified. The first upper and lower ribs 12,22 define a first lateral side of the frame F, and the second upper and lower ribs 14,24 define a second lateral side of the frame F.

With specific reference to FIG. 8B, the front hook FH includes an open mouth MF and a closed inner region IF, with the open mouth MF oriented in a first or forward direction facing away from the rear hook RH. A reference line that lies parallel to a line that includes the first and second pin-on axes X1,X2, or a line that extends through the centers of the first and second attachment pins P1,P2 of an associated attachment, will extend through the open mouth MF.

The rear hook RH includes an open mouth MR and a closed inner region IR. The open mouth MR of the rear hook RH is oriented downwardly (away from the upper portion U) and transversely relative to the open mouth MF of the front hook FH and transversely relative to the reference line that extends between the first and second pin-on axes X1,X2 or the reference line that connects the centers of the associated attachment pins P1,P2. This relative transverse arrangement of the mouth MR of the rear hook RH relative to the mouth MF of the front hook FH ensures that the first attachment pin P1 must be received in the front hook FH before the second attachment pin P2 can be received in the rear hook RH by rotation of the frame F about the first attachment pin P1 during attachment coupling, and conversely ensures that during decoupling, the second attachment pin P2 must be withdrawn from the rear hook RH by rotation of the coupler frame F about the first attachment pin P1 before the first attachment pin P1 can be withdrawn from the front hook FH.

The coupler 10 further comprises a rear hook lock or lock assembly 30 located between the first and second lower ribs 22,24 and movable relative to lower ribs 22,24 between an unlocked or retracted position (FIG. 8B) where it is located so not to block (i.e., to open) the mouth MR of the rear hook RH completely or at least sufficiently to allow insertion and withdrawal of the second attachment pin P2, and a locked or extended position (FIG. 7) where it completely or at least substantially obstructs or blocks (closes) the mouth MR sufficiently to capture the second attachment pin P2 in the rear hook RH. The frame F is removed from FIGS. 5A and 5B to show the rear hook lock 30 and other components more clearly.

The rear lock 30 is shown as a multi-piece assembled construction but could be a one-piece structure. The rear lock 30 comprises a lower lock body or lower lock plate 32a that is slidably connected to the frame F. In particular, opposite first and second lateral sides of the lower lock plate 32a are respectively slidably supported in first and second lower slots LS1,LS2 located respectively in the first and second lower ribs 22,24 of the frame F adjacent an inner side of the mouth MR of the rear hook RH (i.e., adjacent the side of the mouth MR that is located between the front hook FH and rear hook RH) such that the lower lock plate 32a spans the space between the first and second lower ribs 22,24. The first and second lower slots LS1,LS2 are mirror images of each other and extend linearly. Similarly, the rear lock 30 comprises an upper lock body or upper lock plate 32b that is spaced-apart from and located parallel to the lower lock plate 32a. The upper lock plate 32b is also slidably connected to the frame F, by receipt of its opposite first and second lateral sides respectively in first and second upper slots US1,US2 located respectively in the first and second lower ribs 22,24 of the frame F such that the upper lock plate 32b spans the space between the first and second lower ribs 22,24. The first and second upper slots US1,US2 are mirror images of each other and each begin at a location adjacent the inner region IR of the rear hook RH and extend parallel with the lower slots LS1,LS2 toward a central/middle portion of the coupler 10 bounded by the front and rear hooks FH,RH and the first and second pin-on axes X1,X2. The lower and upper lock plates 32a,32b are interconnected by at least one and preferably first and second parallel spaced-apart connector plates 34 arranged transversely relative to the lower and upper lock plates 32a,32b.

As such, the rear lock 30 is slidably supported by both the lower slots LS1,LS2 and upper slots US1,US2 and is linearly slidable/movable in the slots between: (i) a retracted/unlocked position (FIG. 8B) where the lower lock plate 32a is retracted relative to the mouth MR of the rear hook RH so that the mouth MR is open completely or at least sufficiently to receive (or release) the second attachment pin P2 into (or out of) the rear hook RH; and, (ii) an extended/locked position (FIGS. 7 & 8A) where the lower lock plate 32a is extended into and/or at least partially across the mouth MR of the rear hook RH so that the lower lock plate 32a obstructs the mouth MR so as to capture the second attachment pin P2 in the rear hook RH.

With specific reference to FIG. 7, the position of the rear hook lock 30 and its lower lock plate 32a when the rear hook lock 30 is in its extended/locked position (and the location of the second attachment pin P2 in the rear hook RH) will vary depending upon the pin spacing between the first and second attachment pins P1,P2. FIG. 7 shows a pin spacing between the first and second attachment pins P1,P2 that is between the longest and shortest possible pin spacings that can be coupled with the coupler 10. It should be noted that the lower lock plate 32a will be located in the lower slots LS1,LS2 and the upper lock plate 32b will be located in the upper slots US1, US2 when the rear lock 30 is extended/locked for all possible pin spacings of the first and second attachment pins P1,P2. As such, forces from the second attachment pin P2 are directed to the coupler frame F through both the lower and upper lock plates 32a,32b, which has been deemed to be highly desirable for strength and durability of the coupler 10.

Figure 1:
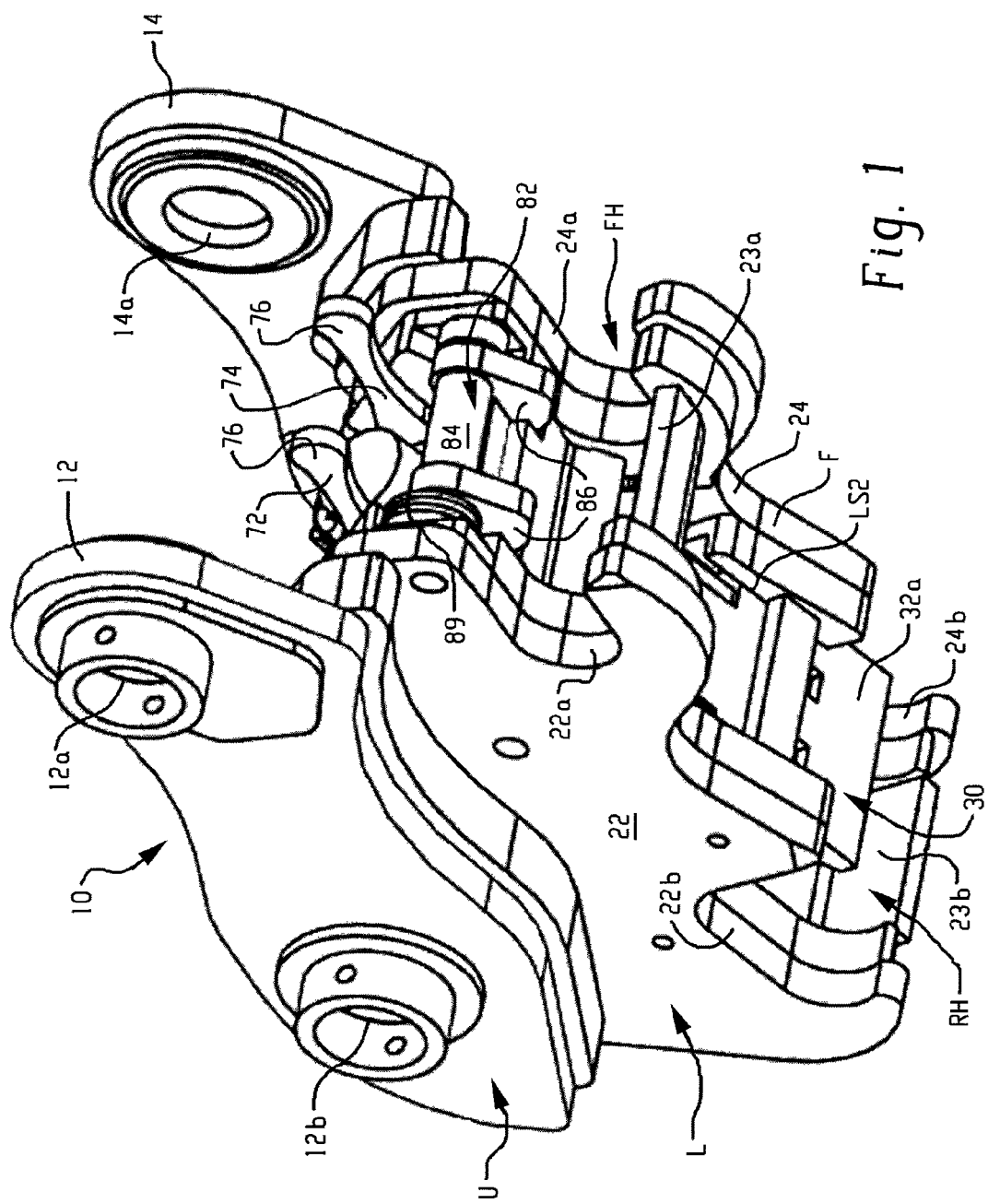
FIGS. 1-3 are isometric views of a coupler formed in accordance with the present development.
Figure 2:
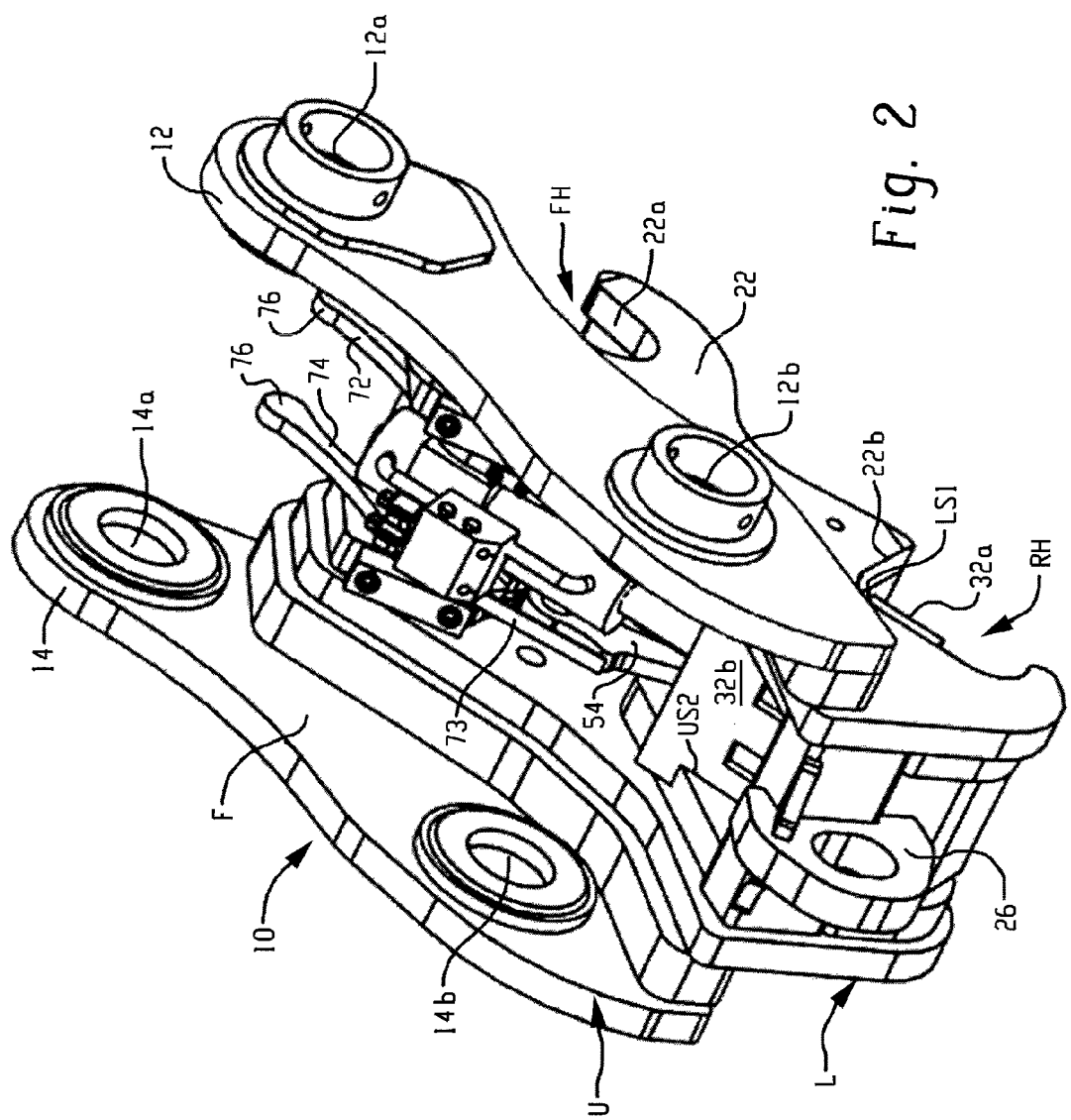
Figure 3:
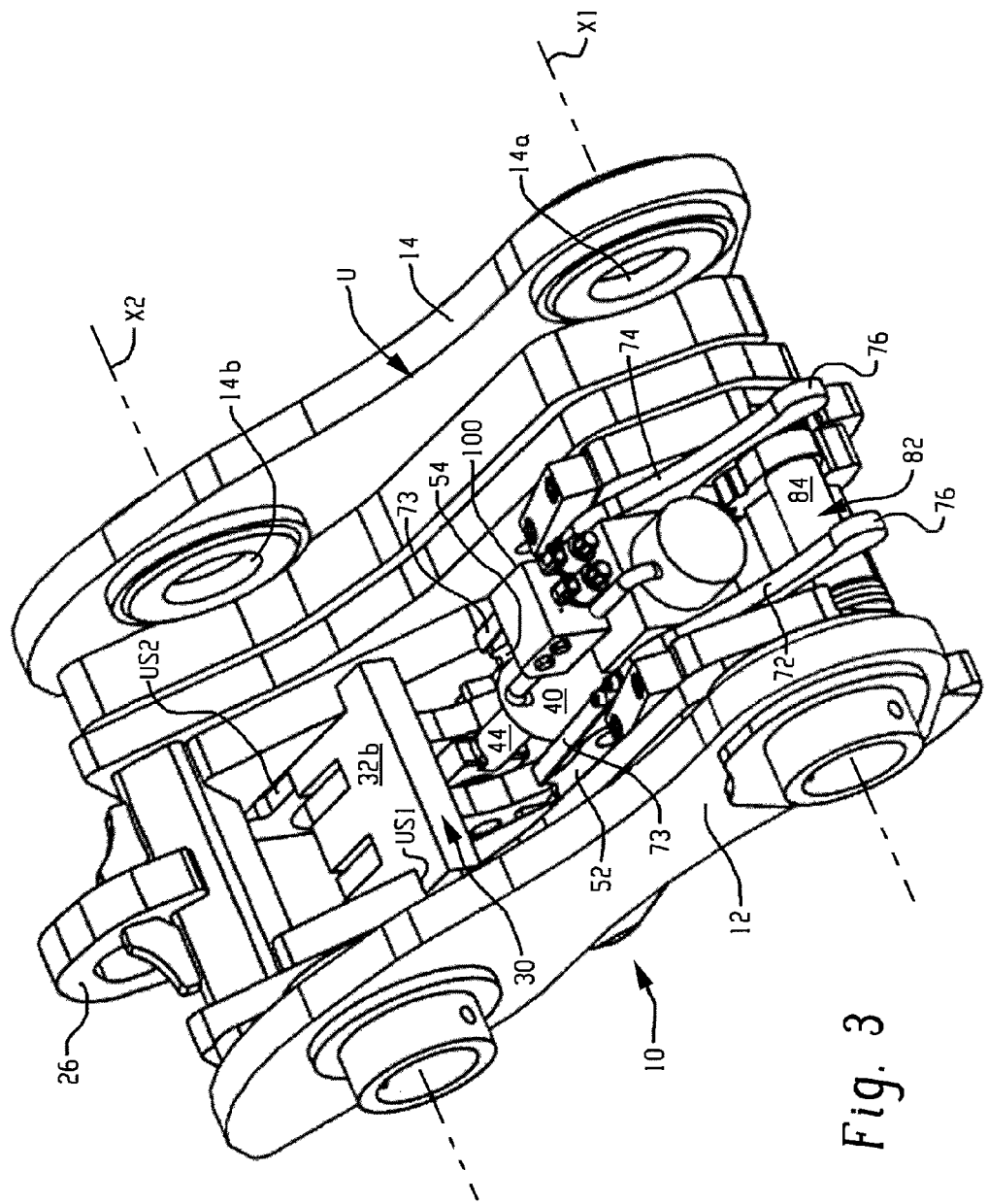
Figure 4:
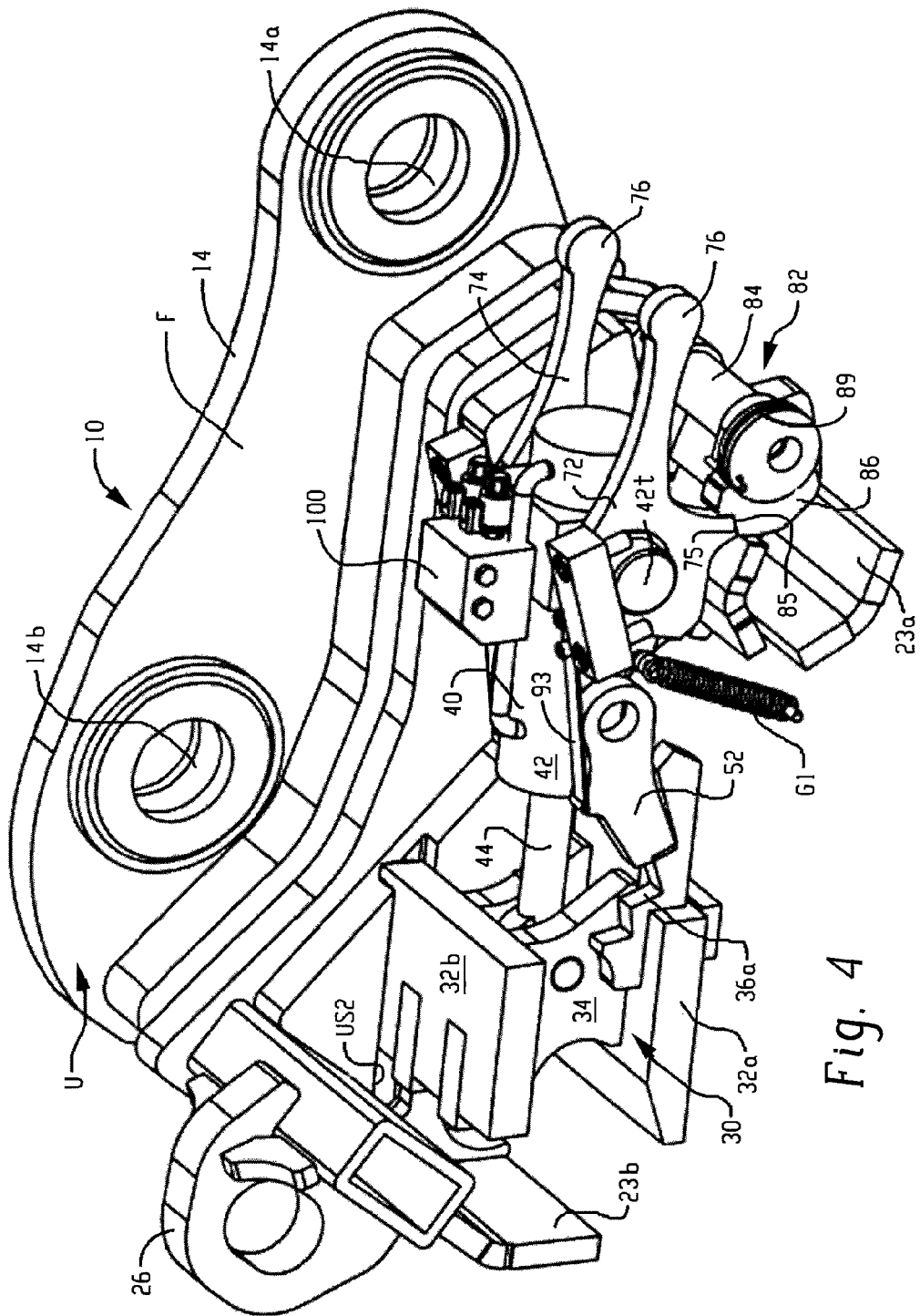
FIG. 4 is similar to FIG. 3 but portions of the left side of the coupler are removed to reveal internal components.
Figure 5A:
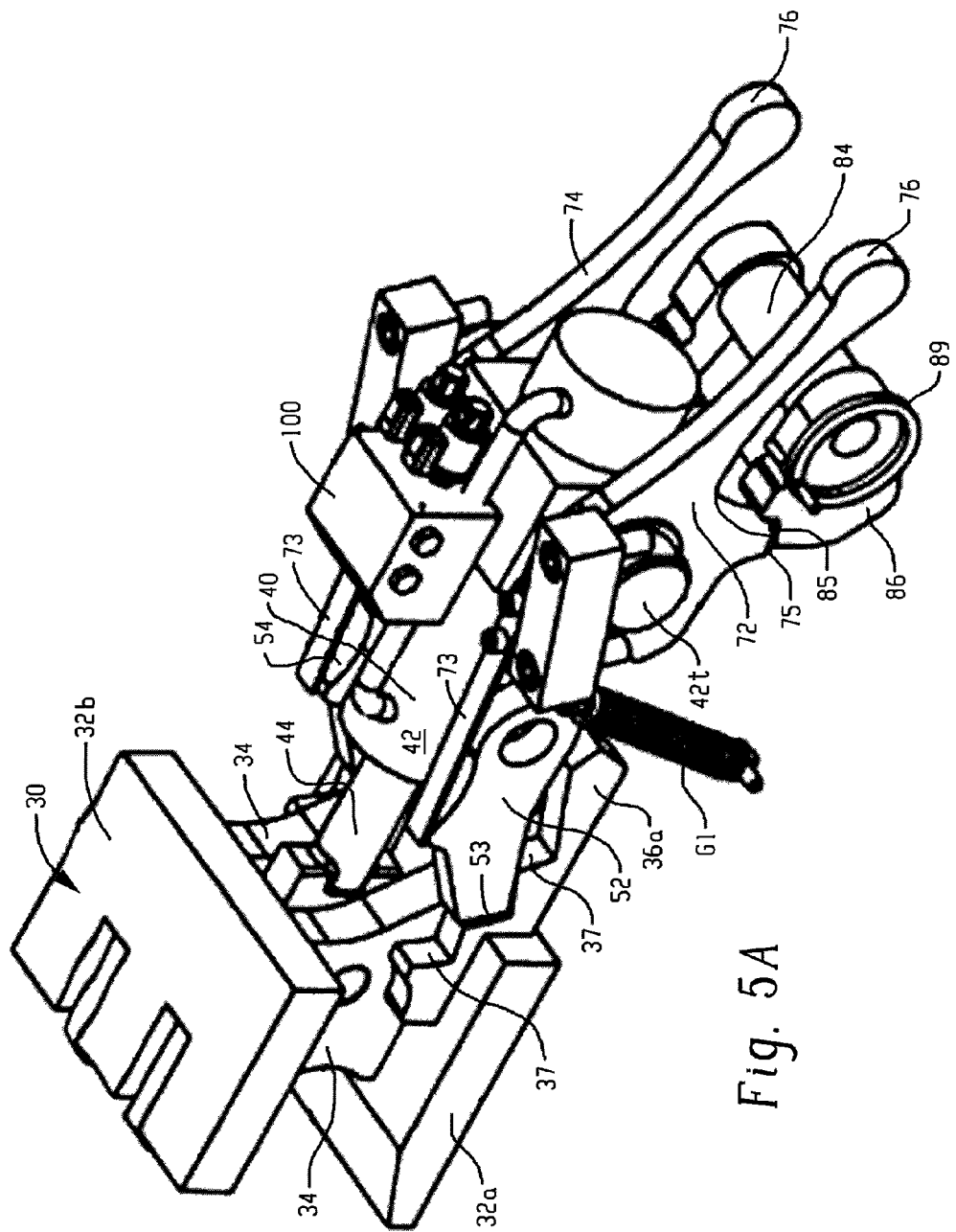
FIGS. 5A and 5B are first and second isometric views of internal components of the coupler for releasably engaging first and second associated attachment pins.
Figure 5B:
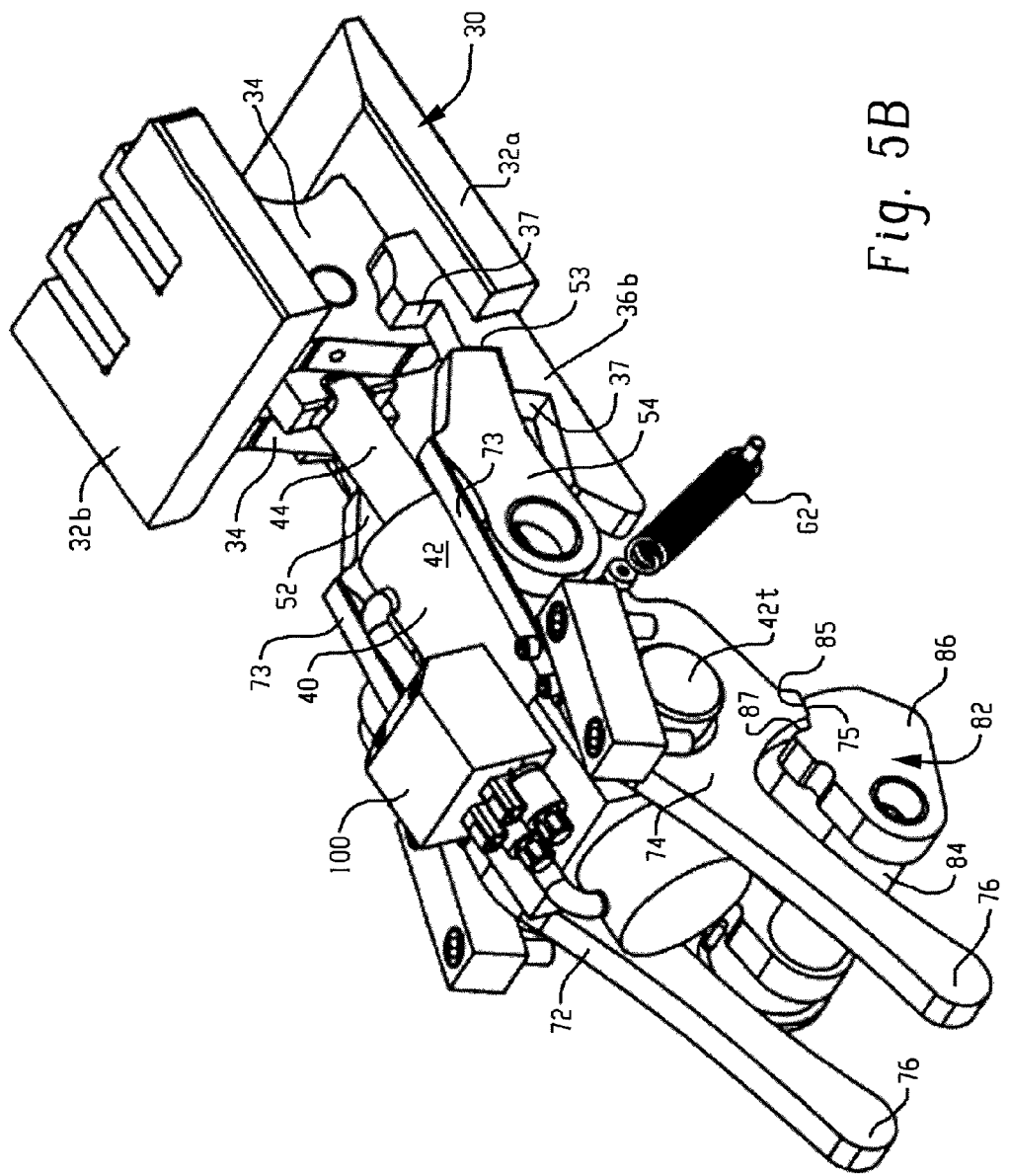

As can be seen in FIGS. 4, 5A and 5B, the coupler 10 further comprises an actuator 40 operatively connected between the frame F and the rear lock 30 and adapted to move the rear lock 30 selectively to and between its extended/locked and retracted/unlocked positions and to hold the rear lock 30 in either the locked or unlocked position. In the illustrated embodiment, the actuator 40 comprises a hydraulic cylinder having a body 42 anchored to the frame F, e.g., using a trunnion 42t or other mount between the lower ribs 22,24. The hydraulic cylinder further comprises a rod 44 that is operatively coupled to the rear lock 30, e.g., between the first and second connector plates 34 as shown in the present example. The rod 44 is selectively extensible from and retractable into the cylinder body 42 by hydraulic fluid pressure supplied to the body 42 from the hydraulic system of the associated excavator through extend and retract ports, respectively, as described in full detail below.

The coupler 10 comprises at least one and preferably first and second gravity locks 52,54 that pivot relative to the frame F and that are located respectively adjacent the first and second lateral sides of the frame F. In the exemplary embodiment, the first and second gravity locks 52,54 are respectively directly pivotally connected to the first and second lower ribs 22,24, but they can alternatively be connected directly or indirectly to other parts of the frame F. As shown the first and second gravity locks 52,54 are respectively pivotally connected to the first and second lower ribs 22,24. The first and second gravity locks 52,54 are selectively able to pivot by their own weight due to the force of gravity between an engaged (blocking) position (FIGS. 5A, 5B and 7) and a disengaged (unblocking/permitting) position (FIGS. 8A, 8B, 8C), independently of each other depending upon the orientation of the frame F. When the first and second gravity locks 52,54 are in the engaged position, they block movement of the rear lock 30 from its extended (locked) position to its retracted (unlocked position). When the first and second gravity locks 52,54 are in the disengaged position, e.g., when the coupler 10 is in its curled or crowded position relative to the arm DS, they permit movement of the rear lock 30 from its extended (locked) position to its retracted (unlocked position).

Preferably, the rear lock 30 further comprises first and second lock face regions 36a,36b each comprising multiple lock faces 37 arranged in a step or saw-tooth or ratchet structure. When the gravity locks 52,54 are in the engaged position, a tip 53 or other portion of the first and second gravity locks 52,54 will lie adjacent and/or be aligned with one of the lock faces 37 of the respective first and second lock face regions so that the distance between the engaged first and second gravity locks 52,54 and one of the lock faces 37 will never exceed a maximum safe distance. The maximum safe distance is calculated such that when the rear lock 30 is extended (locked) and the first and second gravity locks 52,54 are engaged, the rear lock 30 will never be able to be moved toward its retracted/unlocked position a distance that would allow the second attachment pin P2 to escape from the rear hook RH, for all pin spacings between the first and second attachment pins P1,P2.

The coupler 10 further comprises first and second supplemental lock arms or lock bars 72,74 that selectively control movement of the first and second gravity locks 52,54, respectively. The first and second lock arms 72,74 are located respectively adjacent the first and second lateral sides of the frame F and pivot relative to the frame F. As shown, the first and second lock arms 72,74 are respectively pivotally connected to the trunnions 42t located on the opposite sides of the actuator cylinder body 42 (see FIGS. 2A, 5A,5B), but they could alternatively be respectively connected directly to the first and second lower ribs 22,24 or other part of the frame F. The lock arms 72,74 move between a disengaged or up position (FIGS. 8A, 8B, 8C) and an engaged or down position (FIGS. 5A, 5B, 7). Each lock arm 72,74 comprises an elongated resilient keeper arm 73 projecting outwardly there from toward the rear hook RH. When the first and second lock arms 72,74 are in their respective engaged/down positions, the resilient keeper arms 73 thereof are located in an engaged position and abut the gravity locks 52,54, respectively, and urge or bias the gravity locks 52,54 toward their engaged positions. When the lock arms 72,74 are moved to their disengaged/up positions, their respective keeper arms 73 are correspondingly moved to a disengaged position where they are spaced from the gravity locks 52,54 and allow the gravity locks to pivot freely from their engaged positions to their disengaged positions by force of gravity, depending upon the orientation of the coupler frame F. In one embodiment, each keeper arm 73 comprises a stack of one or more flat springs or leaf springs, wherein the number of springs is varied to control the rigidity/flexibility of the keeper arm.

Each lock arm 72,74 also comprises a lock face 75 and a projecting tail 76. The projecting tails 76 extend into the region between the first hook FH and the first apertures 12a, 14a of the frame. The lock arms 72,74 are spring-biased into the engaged position. As shown, the coupler 10 comprises first and second lock arm springs, such as coiled tension springs G1,G2, respectively connected between the first and second lock arms 72,74 and first and second anchor points on the frame F (a torsion spring mounted coaxially about each lock arm pivot axis can alternatively/additionally be used).

FIGS. 7 and 8A illustrate operation of the first and second lock arms 72,74 (only the lock arm 72 is visible, but the lock arm 74 is structured and functions in a corresponding manner). FIG. 7 shows the coupler 10 with the rear hook lock 30 in its extended/locked position such that the first and second attachment pins P1,P2 are operatively engaged with the coupler. The lock arm 72 is held in its engaged position by the biasing spring G1. The keeper arm 73 of the lock arm 72 is abutted with the gravity lock 52 and urges the gravity lock 52 to its engaged position where the gravity lock 52 is positioned to abut the lock face region 36a with its tip 53 located adjacent one of the lock faces 37 such that the gravity lock 52 is located to block movement of the rear hook lock 30 from its extended/locked position to its retracted/unlocked position in case the hydraulic cylinder or other actuator 40 fails or is operated to retract the rear hook lock 30 from its extended/locked position toward its retracted/unlocked position.

If the coupler 10 is rotated relative to excavator arm DS to its curled or crowded position as shown in FIG. 8A, the projecting tail 76 of lock arm 72 contacts the excavator arm DS so that the lock arm 72 is pivoted relative to the frame F to its disengaged position against the biasing force of spring G1 so that the keeper arm 73 is moved to its disengaged position where the keeper arm 73 is spaced from the gravity lock 52 such that the gravity lock 52 is free to pivot from its engaged position to its disengaged position by force of gravity depending on the orientation of the coupler frame F.

When the gravity lock 52 (and gravity lock 54) is located in its disengaged position, the hydraulic cylinder 40 is able to move the rear hook lock 30 from its extended/locked position (FIG. 8A) to its retracted/unlocked position (FIG. 8B) to release the second attachment pin P2 from the rear hook RH as indicated by arrow A1 (FIG. 8C). As is further apparent in FIG. 8C, when the coupler 10 is pivoted away from the curled or crowded position in order to release the second attachment pin P2, the rear hook lock 30 blocks return of the lock arm 72 to its engaged position by spring G1 until the rear hook lock 30 is once again extended to its locked position (the retracted rear hook lock 30 also blocks the gravity locks 52,54 from returning to their engaged positions). The gravity lock 54 and lock arm 74 function in the same manner as described for the gravity lock 52 and lock arm 72. When both lock arms 72,74 are included in the coupler 10, their respective projecting tails 76 can optionally be tied together by a cross-pin or the like. Whether the lock arms 72,74 are isolated from each other (as shown) or tied together, both lock arms 72,74 must be moved to the disengaged position, and both gravity locks 52,54 must be pivoted by gravity to their disengaged positions in order for the rear hook lock 30 to be retracted/unlocked by the hydraulic cylinder 40 or other actuator.

Figure 8D:
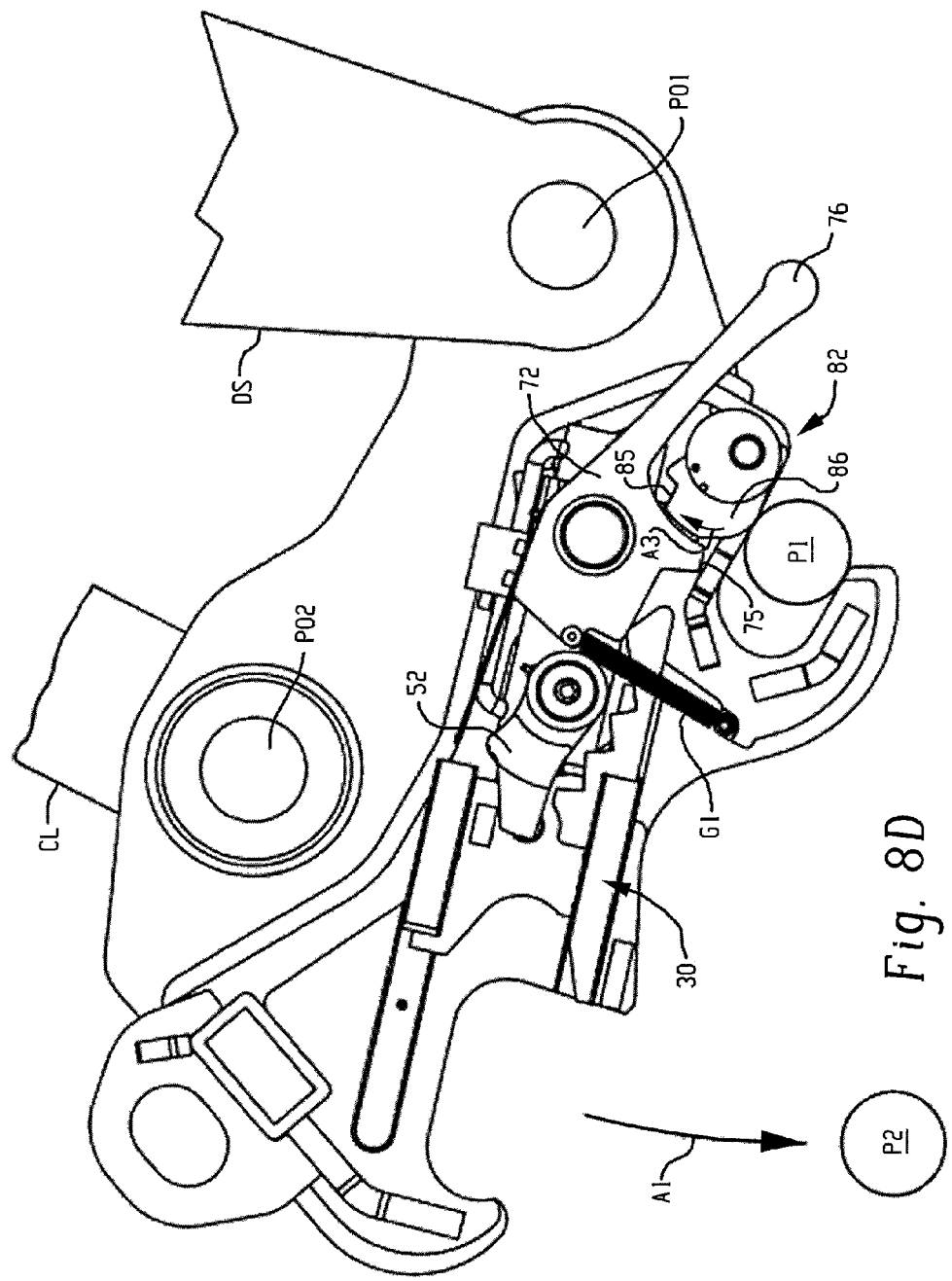

The coupler 10 further comprises a secondary lock associated with and adjacent the front hook FH to prevent undesired escape of the first attachment pin P1 from the front hook FH. The secondary lock comprises a latch 82 operatively connected to the coupler frame F and adapted to move between an extended position (see FIG. 8C) and a retracted position (FIG. 8D). In the illustrated embodiment, the latch 82 comprises a latch bar 84 including at least one and preferably first and second latch projections 86 connected to the latch bar 84. When the latch 82 is located in its extended position, the latch projections 86 project/extend into the mouth MF of the front hook FH and obstruct or restrict the mouth MF sufficiently to prevent the first attachment pin P1 from escaping or moving out of the front hook FH. When the latch 82 is located in its retracted position, the latch projections 86 are withdrawn from the mouth MF of the front hook FH sufficiently to allow the first attachment pin P1 to move out of the front hook FH.

In the illustrated embodiment, the latch 82 moves between its extended/latched and retracted/unlatched positions by corresponding rotation or pivoting of the latch bar 84 between first and second angular positions. The latch bar 84 rotates/pivots about a pivot axis that is parallel to the first and second pin-on axes X1,X2. The latch projection(s) 86 are connected to the latch bar 84 so as to rotate/pivot therewith. From the extended/latched position (FIG. 8C), the latch bar 84 and projections 86 rotate/pivot about the pivot axis in only one direction to the retracted/unlatched position as indicated by the arrow A3 (FIG. 8D). In one embodiment, the latch bar 84 comprises a tubular member, and a pin extends coaxially through the latch bar 84 and is secured to the opposite lateral sides of the frame F. At least one latch spring 89 is engaged between the latch 82 and the frame F to bias the latch 82 to its extended position. In the illustrated example, the spring 89 is a torsion spring engaged at one end with a latch projection 86 and engaged at the other end with the frame F.

The latch 82 is movable in the direction A3 to its retracted position against the biasing force of the spring 89. In particular, as shown in FIG. 8D, the first attachment pin P1, itself, is used to move the latch 82 in the direction A3 from its extended position to its retracted position during movement of the first attachment pin P1 into and out of the front hook FH (unless the latch 82 is in its locked condition as described below). The latch projections 86 each include inner and outer ramp surfaces 86a,86b that converge to a tip as the ramp surfaces extend away from the latch bar 84 and that are configured so that when the first attachment pin P1 contacts either the inner or outer ramp surface 86a,86b with sufficient force, the first attachment pin P1 will urge the latch 82 in the direction A3 toward its retracted position where the latch projections 86 are retracted from the mouth MF of the front hook FH. The inner ramp surface 86a generally faces the inner region IF of the front hook FH and the outer ramp surface 86b generally faces away from the inner region IF.

The latch 82 is selectively locked such that the latch 82 is blocked from moving from its extended position to its retracted position if at least one of the lock arms 72,74 is in its engaged position. As noted above, each lock arm 72,74 includes a lock face 75. When the lock arms 72,74 are engaged, the latch 82 is locked due to the fact that the lock faces 75 of the lock arms 72,74 are located to block movement of the latch 82 from its extended position to its retracted position in the unlatching direction A3. Accordingly, when the latch 82 is in this locked condition, a first attachment pin P1 located in the front hook FH is captured in the front hook FH by the latch projections 86 that obstruct/restrict the mouth MF of the front hook. In the embodiment shown herein, the lock faces 75 engage respective first lock surfaces 85 of the latch projections 86, but the lock faces 75 can alternatively engage any other part of the latch 82 to block movement of the latch 82 from its extended position to its retracted position in the unlatching direction A3. The lock face 75 of each lock arm 72,74 is located so that forces exerted on the latch projections 86 by the first attachment pin P1 are transmitted to the respective lock arm 72,74 through the lock face 75 and urges the lock arm 72,74 toward its engaged position. For each lock arm 72,74, engagement of its lock face 75 with a corresponding first lock surface 85 of a latch projection 86 provides a stop that defines the engaged/down position for the lock arm 72,74. Also, when the lock arms 72,74 are engaged/down, a second lock surface 87 (FIG. 7) of each latch projection 86 is located adjacent a portion of the lock arm 72,74, and engagement between the second lock surface 87 and the corresponding lock arm 72,74 prevents rotation/pivoting movement of the latch projection 86 in a direction opposite the unlatching direction A3 which could also lead to escape of the attachment pin P1. As is apparent from FIG. 8D, when the lock arms 72,74 are in their disengaged positions, the latch 82 is able to be moved by the first attachment pin P1 to its retracted position to allow insertion/removal of the first attachment pin P1 in the direction A3 relative to the front hook FH. If the coupler 10 includes only a single lock arm 72,74, such single lock arm will include a lock face 75 adapted to engage the latch 82 when the lock arm 72,74 is engaged, to prevent movement of the latch 82 from its extended position to its retracted position.

Decoupling of an attachment AT from the coupler 10 is accomplished by first curling the coupler 10 until the projecting tails 76 of lock arms 72,74 contact the excavator arm DS causing the lock arms 72,74 to move to their disengaged positions, which allows the gravity locks 52,54 to swing to their disengaged positions by their own weight (FIG. 8A). The hydraulic cylinder or other actuator 40 is then used to move the rear hook lock 30 to its retracted/unlocked position (FIG. 8B). With the rear hook lock 30 retracted/unlocked, the coupler 10 can be rotated relative to the excavator arm DS so that the second attachment pin P2 exits rear hook RH as shown by arrow A1 (FIG. 8C). As shown in FIG. 8C, the retracted rear hook lock 30 prevents return movement of the lock arms 72,74 to their engaged positions when the coupler 10 is rotated away from the curled position. Once the second attachment pin P2 is free of the rear hook RH, the coupler 10 is moved (with the attachment supported on the ground or other safe location) so that the first attachment pin P1 is forced from the front hook FH (FIG. 8D) which requires that the first attachment pin P1 urge the latch 82 in the direction A3 to its retracted position by contact between the first attachment pin P1 and the inner ramp surfaces 86a of each latch projection 86.

To operatively engage an attachment AT including the first and second attachment pins P1,P2, the coupler 10 is curled so that the tails 76 of the lock arms 72,74 engage the excavator arm DS and the lock arms 72,74 pivot to their disengaged positions (FIG. 8A, without the attachment pins P1,P2). The rear lock 30 is then retracted to open the mouth MR of the rear hook RH (FIG. 8B, without the attachment pins P1,P2). As shown in FIG. 8D, the coupler 10 is them rotated relative to the excavator arm DS to any desired position to engage the first attachment pin P1 with the front hook FH (the retracted rear hook lock 30 blocks return movement of the lock arms 72,74 to their engaged positions when the coupler is rotated away from the curled position). Movement of the first attachment pin P1 into the front hook FH pushes the latch projections 86 in the direction A3 to their retracted positions by contact between the pin P1 and the outer ramp surfaces 86b so that the pin P1 is able to move fully into the front hook FH. The coupler 10 is then again rotated relative to excavator arm DS and about the first attachment pin P1 so that the second attachment pin P2 moves fully into the rear hook RH (FIG. 8B). The actuator 40 is then operated to extend the rear hook lock 30 to its locked position as shown in FIG. 8A. As shown in FIG. 7, when the coupler 10 is rotated from its curled/crowded position such that the projecting tails 76 of the lock arms 72,74 separated from the associated excavator arm DS, the lock arm springs G1,G2 will move the lock arms 72,74 back to their engaged positions which will cause the keeper arms 73 to contact the respective gravity locks 52,54 and urge same toward their engaged positions (and/or the gravity locks 52,54 will pivot by their own weight into their engaged positions depending upon the exact orientation of the coupler frame F). Also, when the lock arms 72,74 are returned to their engaged positions by the springs G1,G2, the lock faces 75 of the lock arms 72,74 are moved adjacent the lock surfaces 85 of the latch projections 86 such that the front hook secondary latch 82 is then locked.

The coupler 10 can further comprise one or more electrical sensors or switches SW1 (FIG. 7) connected to the frame F and adapted to sense the position of the rear hook lock 30 (or another component) to indicate when the rear hook lock 30 is (or is not) in its extended/locked position. The switch SW1 can be a contact or non-contact switch, e.g., a reed switch or Hall-effect sensor, located to be tripped when the rear hook lock 30 moves to/from its locked position. In such case, the rear hook lock 30 can optionally include a magnet or other component to trip the switch SW1. The switch SW1 outputs an electrical signal that can be used, e.g., by a control system of the excavator, to "numb" or completely disable the excavator in the event the rear hook lock 30 moves out of its locked position at an unexpected time, i.e., when the coupler 10 is not curled sufficiently relative to the excavator arm DS to prevent dropping of the attachment AT even if the rear hook lock 30 is unlocked. Alternatively or additionally, the actuator 40 can include the switch SW1 in or near the actuator 40 so as to sense the position of the rod 44 for the same purpose and result.

Figure 9:
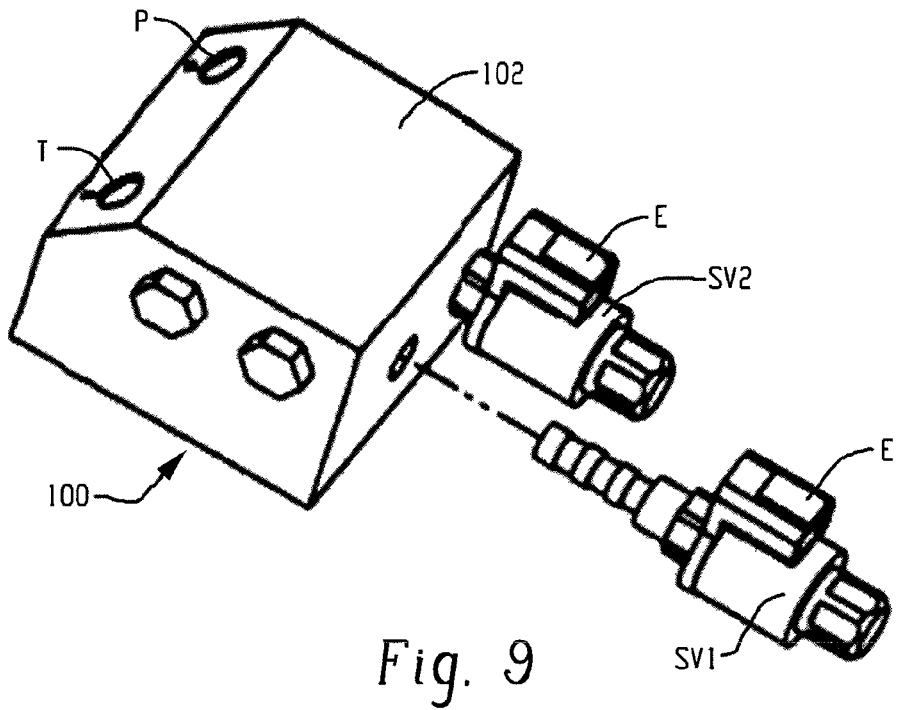
FIG. 9 is a partially exploded view of an optional hydraulic manifold component of the coupler.
Figure 10:
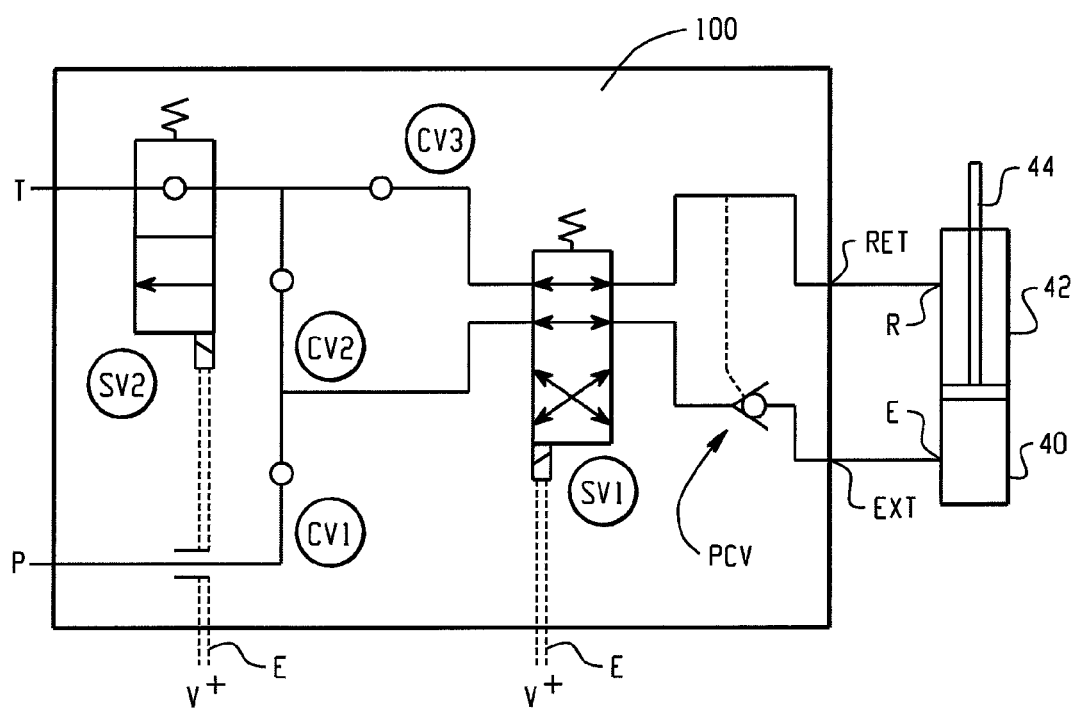
FIG. 10 is a schematic view of the hydraulic manifold and its connection to the hydraulic actuator.

The coupler 10 optionally comprises a hydraulic manifold 100 connected to the hydraulic cylinder 40 or connected to another part of the coupler 10, such as the frame F. The hydraulic manifold 100 is shown separately in FIG. 10. Pressure and tank hydraulic lines of the excavator are connected respectively to the pressure P and tank T locations or ports of the manifold 100. Two electrical connections from the excavator are connected to connectors E of the manifold 100. As shown in FIG. 10, the manifold 100 comprises first and second solenoid valves SV1,SV2 that control the flow of hydraulic oil to and from the coupler hydraulic actuator 40 that controls the position of the rear hook lock 30 through extend and retract ports EXT,RET of the manifold 100. Solenoid valves SV1,SV2 are cartridge valves that are connected to the manifold body 102 as shown in FIG. 9A. The solenoid valves SV1,SV2 include the electrical connectors E for receiving operating electrical voltage $V^+$ through a wiring harness. The manifold also includes the check valves CV1,CV2,CV3, and includes a pilot check valve PCV that prevents retraction of the cylinder rod 44 in the absence of sufficient hydraulic fluid pressure being supplied to the retract port R of the cylinder 40, i.e., the pilot check valve PCV prevents retraction of the rod 44 simply due to loss of pressure at the extend side E of the hydraulic cylinder 40 so that the retract side R of the cylinder must be actively pressurized in order for the rod 44 to move the rear hook lock 30 from its extended/locked position to its retracted/unlocked position. The inclusion of the manifold 100 on the coupler 10 simplifies installation of the coupler 10 as compared to prior system where the manifold was located on the excavator.

The following claims are intended to encompass variations, alternatives, modifications, improvements, equivalents, and substantial equivalents of the embodiments and teachings disclosed herein to the maximum possible extent consistent with the validity of the claims.

The invention claimed is:
1. An attachment coupler comprising:
   a frame including: (i) an upper portion adapted for connection to an associated excavator arm and an associated excavator control link; and, (ii) a lower portion including a front hook and rear hook respectively adapted for engaging first and second associated attachment pins of an associated attachment;
   a rear hook lock movable between an unlocked position and a locked position, wherein said rear hook lock obstructs said rear hook sufficiently to capture the second associated attachment pin in the rear hook when in said locked position and wherein said rear hook lock is withdrawn relative to said rear hook sufficiently to allow movement of the second associated attachment pin into and out of the rear hook when in said unlocked position;

an actuator operably connected to the rear hook lock for moving the rear hook lock to its unlocked position and its locked position;

a first gravity lock that pivots relative to the frame between an engaged position and a disengaged position, said first gravity lock blocking movement of the rear hook lock from its locked position to its unlocked position when said first gravity lock is located in its engaged position;

a first supplemental lock arm movable relative to the frame between an engaged position and a disengaged position, wherein said first supplemental lock arm urges said first gravity lock toward its engaged position when said first supplemental lock arm is in its engaged position, said first supplemental lock arm comprising a lock face and a projecting tail, said projecting tail adapted to contact the associated excavator arm when said coupler frame is located in a select angular position relative to the associated excavator arm to move the first supplemental lock arm from its engaged position to its disengaged position;

a first lock arm spring that biases said first supplemental lock arm toward its engaged position;

a secondary lock located adjacent said front hook, said secondary lock comprising a latch that moves between an extended position and a retracted position, said latch including at least a first latch projection that projects into and obstructs said front hook sufficiently to capture the first associated attachment pin in said front hook when said latch is in its extended position and that is retracted relative to said front hook sufficiently to allow movement of the first associated attachment pin into and out of said front hook when said latch is in its retracted position;

wherein said lock face of said first supplemental lock arm blocks movement of said latch from its extended position to its retracted position when said first supplemental lock arm is in its engaged position; and, wherein said latch is biased to its extended position and is movable from its extended position to its retracted position by contact between the latch and the first associated attachment pin when said first supplemental lock arm is in its disengaged position.

2. The attachment coupler as set forth in claim 1, wherein said latch of said secondary lock pivots relative to said frame between its extended and retracted positions.

3. The attachment coupler as set forth in claim 2, wherein said latch further comprises a latch bar to which said first latch projection is connected, wherein said latch bar pivots relative to said frame about a pivot axis such that pivoting movement of said latch bar relative to said frame moves said latch from its extended position to its retracted position.

4. The attachment coupler as set forth in claim 3, wherein said secondary lock further comprises at least one latch spring that that biases said latch toward its extended position.

5. The attachment coupler as set forth in claim 4, wherein said latch further comprises a second latch projection that projects into and obstructs said front hook sufficiently to capture the first associated attachment pin in said front hook when said latch is in its extended position and that is retracted relative to said front hook sufficiently to allow movement of the first associated attachment pin into and out of said front hook when said latch is in its retracted position, wherein both said first and second latch projections are connected to said latch bar and move with said latch bar when said latch bar pivots relative to said frame.

6. The attachment coupler as set forth in claim 1, wherein said first supplemental lock arm comprises a keeper that abuts said first gravity lock and urges said first gravity lock toward its engaged position when said first supplemental lock arm is in its engaged position.

7. The attachment coupler as set forth in claim 6, wherein said keeper comprises a resilient arm.

8. The attachment coupler as set forth in claim 1, wherein said lock face of said first supplemental lock arm contacts said first latch projection and blocks movement of said latch to its retracted position when said first supplemental lock arm is in its engaged position and said latch is urged toward its retracted position by force exerted on said first latch projection.

9. The attachment coupler as set forth in claim 1, further comprising:

a second gravity lock that pivots relative to the frame between an engaged position and a disengaged position, said second gravity lock blocking movement of the rear hook lock from its locked position to its unlocked position when said second gravity lock is located in its engaged position;

a second supplemental lock arm movable relative to the frame between an engaged position and a disengaged position, wherein said second supplemental lock arm urges said second gravity lock toward its engaged position when said second supplemental lock arm is in its engaged position;

said second supplemental lock arm comprising a keeper that abuts said second gravity lock and urges said second gravity lock toward its engaged position when said second supplemental lock arm is in its engaged position.

10. The attachment coupler as set forth in claim 9, wherein:

said latch further comprises a second latch projection that projects into and obstructs said front hook sufficiently to capture the first associated attachment pin in said front hook when said latch is in its extended position and that is retracted relative to said front hook sufficiently to allow movement of the first associated attachment pin into and out of said front hook when said latch is in its retracted position;

said second supplemental lock arm comprises a lock face and a projecting tail, said projecting tail of said second lock supplemental lock arm adapted to contact the associated excavator arm when said coupler frame is located in said select angular position relative to the associated excavator arm to move the second supplemental lock arm from its engaged position to its disengaged position, and said lock face of said second supplemental lock arm located to block movement of the latch from its extended position to its retracted position when said second supplemental lock arm is in its engaged position;

said coupler further comprising a second lock arm spring that biases said second lock arm toward its engaged position.

11. The attachment coupler as set forth in claim 10, wherein said lock face of said second supplemental lock arm contacts said second latch projection and blocks movement of said latch to its retracted position when said second supplemental lock arm is in its engaged position and said latch is urged toward its retracted position by force exerted on said first latch projection or said second latch projection.

12. The attachment coupler as set forth in claim 1, wherein said rear hook lock comprises:

a lower lock plate slidably connected to said frame by sliding engagement in first and second lower slots of said frame;

an upper lock plate arranged parallel to said lower lock plate and slidably connected to said frame by sliding engagement in first and second upper slots of said frame;

at least one connector plate that interconnects said lower and upper lock plates;

wherein said lower lock plate obstructs said rear hook sufficiently to capture the second associated attachment pin in the rear hook when said rear hook lock is located in its locked position and wherein said lower lock plate is withdrawn relative to said rear hook sufficiently to allow movement of the second associated attachment pin into and out of the rear hook when said rear hook lock is located in its unlocked position.

13. The attachment coupler as set forth in claim 1, further comprising:

at least one sensor connected to the frame for determining a position of the rear hook lock relative to its unlocked and locked positions, said sensor adapted to output an electrical signal that indicates said position of said rear hook lock.

14. The attachment coupler as set forth in claim 1, further comprising a hydraulic manifold connected to said coupler, said hydraulic manifold including: (i) a pressure port; (Ii) a tank port; (iii) first and second solenoid valves that control the flow of hydraulic oil to and from the actuator that controls the position of the rear hook lock.

15. An attachment coupler comprising:

a frame including a front hook and rear hook respectively adapted for engaging first and second associated attachment pins;

a rear hook lock movable between an unlocked position and a locked position relative to said rear hook;

an actuator operably connected to the rear hook lock for moving the rear hook lock to its unlocked position and its locked position;

a gravity lock that moves relative to the frame between an engaged position and a disengaged position, said gravity lock obstructing movement of the rear hook lock from its locked position to its unlocked position when said gravity lock is located in its engaged position;

a supplemental lock arm movable relative to the frame between an engaged position and a disengaged position, said supplemental lock arm comprising a lock face and a projecting tail, said projecting tail adapted to contact an associated excavator arm to move the supplemental lock arm from its engaged position to its disengaged position;

a lock arm spring that biases said supplemental lock arm toward its engaged position;

a secondary lock located adjacent said front hook, said secondary lock comprising a latch that moves between an extended position and a retracted position, wherein said latch obstructs said front hook when said latch is in its extended position, and wherein said lock face of said supplemental lock arm blocks movement of said latch from its extended position to its retracted position when said supplemental lock arm is in its engaged position; and, a spring that urges said latch toward its extended position.

* * * * *